(12) United States Patent
Kodama et al.

(10) Patent No.: US 8,366,206 B2
(45) Date of Patent: Feb. 5, 2013

(54) VEHICLE BRAKE HYDRAULIC PRESSURE CONTROL UNIT

(75) Inventors: Takuro Kodama, Nagano (JP); Motoyasu Nakamura, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 809 days.

(21) Appl. No.: 12/146,149

(22) Filed: Jun. 25, 2008

(65) Prior Publication Data
US 2009/0001808 A1 Jan. 1, 2009

(30) Foreign Application Priority Data

Jun. 28, 2007 (JP) .............................. P.2007-170333

(51) Int. Cl.
B60T 8/40 (2006.01)
(52) U.S. Cl. ................ 303/116.4; 303/116.1; 303/119.3
(58) Field of Classification Search .................... 303/10, 303/115.5, 116.1, 116.3, 116.4, 119.1, 119.2, 303/119.3; 417/363, 360, 322
See application file for complete search history.

(56) References Cited

U.S. PATENT DOCUMENTS

| | | | | | |
|---|---|---|---|---|---|
| 5,449,226 | A | * | 9/1995 | Fujita et al. ................ | 303/116.4 |
| 5,531,573 | A | * | 7/1996 | Nokubo ........................ | 417/360 |
| 6,193,329 | B1 | | 2/2001 | Kanauchi | |
| 6,260,582 | B1 | | 7/2001 | Trautmann | |
| 6,428,121 | B1 | * | 8/2002 | Dinkel et al. ................ | 303/191 |
| 2004/0113488 | A1 | | 6/2004 | Sekihara | |
| 2008/0060889 | A1 | | 3/2008 | Tsuruta | |

FOREIGN PATENT DOCUMENTS

| | | |
|---|---|---|
| DE | 3427906 | 1/1986 |
| DE | 38 36 405 | 5/1990 |
| DE | 101 07 814 | 5/2002 |
| JP | 53 13246 | 11/1993 |
| JP | 07047945 | 2/1995 |
| JP | A747945 | 2/1995 |
| JP | 09099824 | 4/1997 |
| JP | 11139284 | 5/1999 |
| JP | 2001213293 | 8/2001 |
| JP | 2002 510260 | 4/2002 |
| JP | 2007331701 | 12/2007 |
| WO | 2007/148548 | 12/2007 |

OTHER PUBLICATIONS

European Search Report for corresponding European Application No. 08011586.8-2423 dated Sep. 24, 2010.
Office Action for corresponding Japanese Application No. 2007-170333.
Office Action dated Jun. 6, 2011 for corresponding European Application No. 08 011 586.8-2423.
Office Action for corresponding patent application No. 08011586.8 dated Oct. 23, 2012.

* cited by examiner

*Primary Examiner* — Xuan Lan Nguyen
(74) *Attorney, Agent, or Firm* — Andrew M. Calderon; Roberts Mlotkowski Safran & Cole, P.C.

(57) ABSTRACT

A flange 62 having motor mounting through holes 63 is provided on a motor 6, motor mounting holes 19 are provided on a base body 1, so that motor mounting screw 61 are passed through the motor mounting through hole 63 from a back surface 1*b* side so as to be screwed into the motor mounting holes 19 to fix the motor 6 to the base body 1. Housing mounting holes 83 are provided on a control housing 8, housing mounting through holes 17 are formed on the base body 1 so as to be offset from portions which are in abutment with the flange 62, so that housing mounting screws 81 are passed through the housing mounting through holes 17 from the back surface 1*b* side so as to be screwed into the housing mounting holes 83 to fix the control housing 8 to the base body 1.

22 Claims, 5 Drawing Sheets

VEHICLE BRAKE HYDRAULIC PRESSURE CONTROL UNIT

BACKGROUND OF THE INVENTION

1. Field of the Invention

The present invention relates to a vehicle brake hydraulic pressure control unit.

2. Description of Related Art

Various types of vehicle brake hydraulic pressure control units have been proposed, and among them, for example, there are vehicle brake hydraulic pressure control units which are described in Japanese Patent Unexamined Publication JP-A-07-47945 and U.S. Patent Examined Publication U.S. Pat. No. 6,260,582 B1.

In a vehicle brake hydraulic pressure control unit described in the JP-A-07-47945, a flange having through holes is provided on a motor, and by inserting screws from the motor side through the through holes so as to be screwed into a base body, the motor is fixed to the base body. On the other hand, a flange having through holes is also provided on a control housing, and by inserting screws from the control housing side through the through holes so as to be screwed into the base body, the control housing is fixed to the base body.

In a vehicle brake hydraulic pressure control unit described in the U.S. Pat. No. 6,260,582 B1, through holes are formed on a flange of a motor, and through holes are also formed on a base body coaxially with the through holes of the motor flange, and by inserting screws from the motor side through the through holes of the motor and the through holes of the base body so as to be screwed into a control housing, the motor, base body and control housing are fixed together.

In the vehicle brake hydraulic pressure control unit disclosed in JP-A-07-47945, however, the flanges are provided on both the motor and the control housing to prevent the interference of heads of the screws and a mounting tool (for example, a screw driver) with the motor main body or the housing main body, and due to the flange being provided on the control housing which is a relatively large constituent member, the control housing is made larger in size. Because of this, the base body is also made large in size in a portion which corresponds to the flange, these leading to a problem that an increase in overall size of the vehicle brake pressure control unit.

In contrast to this, in the vehicle brake hydraulic pressure control unit disclosed in U.S. Pat. No. 6,260,582 B1, since the screws are screwed into the base body from a back surface of the control housing, the flange of the control housing does not have to be formed large, and hence, a reduction in size of the control housing can be attained, whereby a reduction in size of the vehicle brake hydraulic pressure control unit has been attained.

In this vehicle brake hydraulic pressure control unit, however, since the configuration is adopted in which the common screws are used to fasten the base body and the control housing together, when considering tolerances of the respective constituent members, the inside diameters of the through holes of the flange of the motor and the through holes of the base body need to be set larger than the outside diameter of the screws in advance, to which extent the base body and the flange of the motor are enlarged in size.

In addition, in the event that the respective through holes are increased due to the tolerances, a certain length of time is necessary to position the respective members in a radial direction, this deteriorating the assembling efficiency, and furthermore, there has been caused a problem that looseness is generated between the respective constituent members after they have been assembled together.

SUMMARY OF THE INVENTION

The invention has been made with a view to solving these problems, and a problem that the invention is to solve is to provide a vehicle brake hydraulic pressure control unit which can realize the miniaturization of the unit and prevent the reduction in efficiency and accuracy with which constituent members are assembled together.

With a view to solving the aforesaid problems, according to a first aspect of the invention, there is provided a vehicle brake hydraulic pressure control unit including:

a base body which has a front surface and a back surface;

solenoid valves mounted to the base body;

pumps incorporated in the base body;

a control unit which controls the solenoid valves;

a control housing which is provided on the front surface of the base body and encircles the solenoid valves and the control unit and motor which is provided on the back surface of the base body and drives the pumps incorporated in the base body, wherein a flange having a motor mounting through hole is provided on the motor, a motor mounting hole is provided on the base body, a motor mounting screw is passed through the motor mounting through hole of the motor from the back surface side so as to be screwed into the motor mounting hole of the base body to fix the motor to the base body, a housing mounting hole is provided on the control housing, a housing mounting through hole is formed on the base body in such a manner as to be offset from a portion which is in abutment with the flange of the motor, and a housing mounting screw is passed through the housing mounting through hole of the base body from the back surface side so as to be screwed into the housing mounting hole of the control housing to fix the control housing to the base body.

According to the configuration described above, since the housing mounting screw is mounted from the back surface side of the base body, the housing mounting screw does not interfere with a housing main body during the assembling work. Consequently, the installation position of the housing mounting screw can be located inwards, and the flange does not have to be made to project from an outermost circumferential surface of the control housing. Thus, the control housing and the base body can be made smaller in size, whereby a reduction in the overall size of the vehicle brake hydraulic pressure control unit can be realized.

In addition, since the housing mounting screw and the motor mounting screw are provided individually, the tolerance only has to be considered between the base body and the motor, and between the base body and the control housing, inside diameters of the through hole of the flange of the motor and the through hole of the base body can be made smaller than those of the vehicle brake pressure control unit of U.S. Pat. No. 6,260,582 B1, whereby the enlargement of the base body and the flange of the motor, the deterioration in assembling efficiency due to the increase in time for positioning the constituent members together and the radial looseness can all be prevented.

Furthermore, since the housing mounting screw and the motor mounting screw can be fastened from the same direction, the assembling efficiency is improved further.

In addition, according to a second aspect of the invention, there is provided the vehicle brake hydraulic pressure control unit as set forth in the first aspect of the invention, wherein the motor mounting hole is formed in two locations, one of the motor mounting holes is formed, as is seen from the back surface side, on the back surface to be situated at radially one side of one of pump holes which are formed on both sides of a motor bearing hole formed on the base body, and the other motor mounting hole is formed, as is seen from the back surface side, on the back surface at radially the other side of the other pump hole.

Please note that upwards of a pump hole corresponds to "on the back surface to be situated at radially one side of one of pump holes" and downwards of a pump hole corresponds to "on the back surface at radially the other side of the other pump hole."

According to the configuration described above, since the motor mounting screws can be fastened to the positions which are disposed in a point symmetry fashion about the motor bearing hole, the motor can be fixed in a stable state. Furthermore, the flange of the motor is not formed to project upwards and downwards of the motor, whereby the vertical length of the base body can be reduced.

According to the vehicle brake hydraulic pressure control unit of the invention, the size thereof can be reduced, and the deterioration in assembling efficiency with which the motor, the base body and the control housing are assembled together and the radial looseness therebetween after they have been assembled can be prevented.

DETAILED DESCRIPTION OF THE PREFERRED EMBODIMENTS

Hereinafter, a detailed explanation for carrying out the invention will be described with referring to the accompanying drawings.

Figure 1:
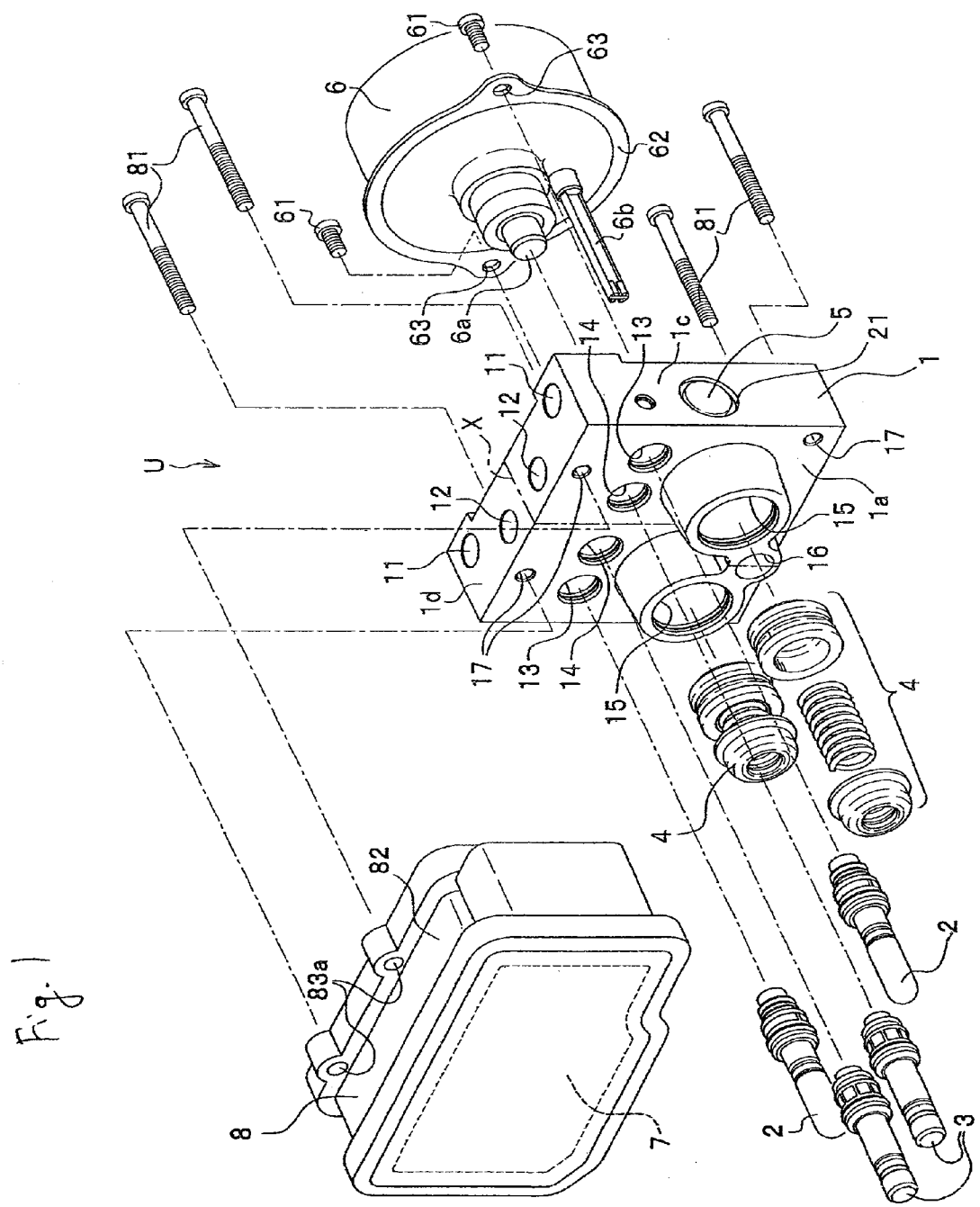
FIG. 1 is an exploded perspective view of a brake hydraulic pressure control unit for a vehicle with a handlebar according to an embodiment of the invention.

As shown in FIG. 1, a vehicle brake hydraulic pressure control unit (hereinafter, referred to as a "brake hydraulic pressure control unit") U is such as to be suitable for a vehicle with a handlebar, and is configured to include a base body 1, solenoid valves 2, 3, reservoirs 4, a pump 5, a motor 6, an electronic control unit (a control unit) 7, and a housing (a control housing) 8. The housing 8 is assembled to a front surface 1a of the base body 1 and accommodates therein the electronic control unit 7. The motor 6 is assembled on to a back surface 1b of the base body 1 (refer to FIG. 3).

(Configuration of Vehicle Brake Hydraulic Pressure Control Unit)

Next, the construction of the brake hydraulic pressure control unit will be described. Note that when used in the following description, "lateral/laterally or horizontal/horizontally" and "upward and downward" denote positions which are determined as a matter of convenience based on states of constituent components shown in the drawings, and hence, the positions denoted thereby have nothing to do with states where the constituent components are actually mounted on a vehicle.

(Base Body)

Firstly, the configuration of the base body 1 will be described in detail by reference to FIGS. 1 to 4.

Figure 2:
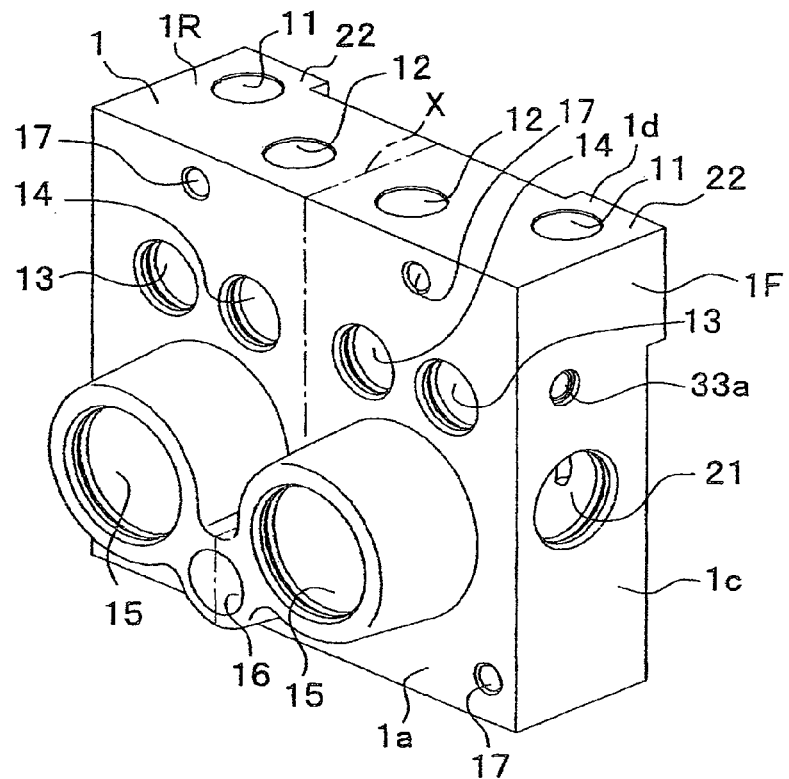
FIG. 2 is a perspective view of a base body according to the embodiment of the invention as viewed from a forward obliquely upward position.
Figure 3:
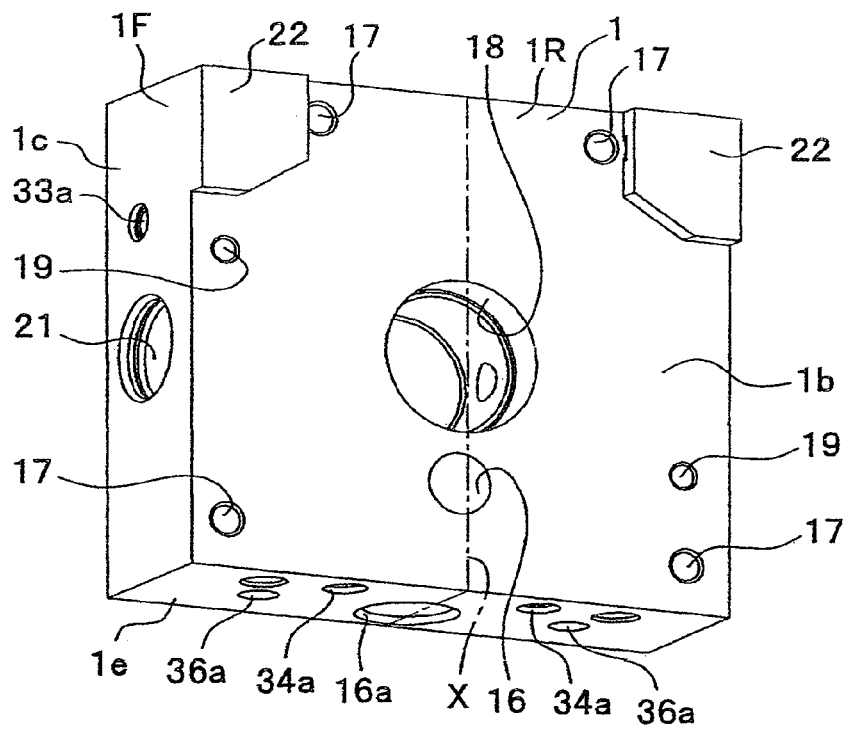
FIG. 3 is a perspective view of the base body according to the embodiment of the invention as viewed from a rear obliquely downward position.
Figure 4:
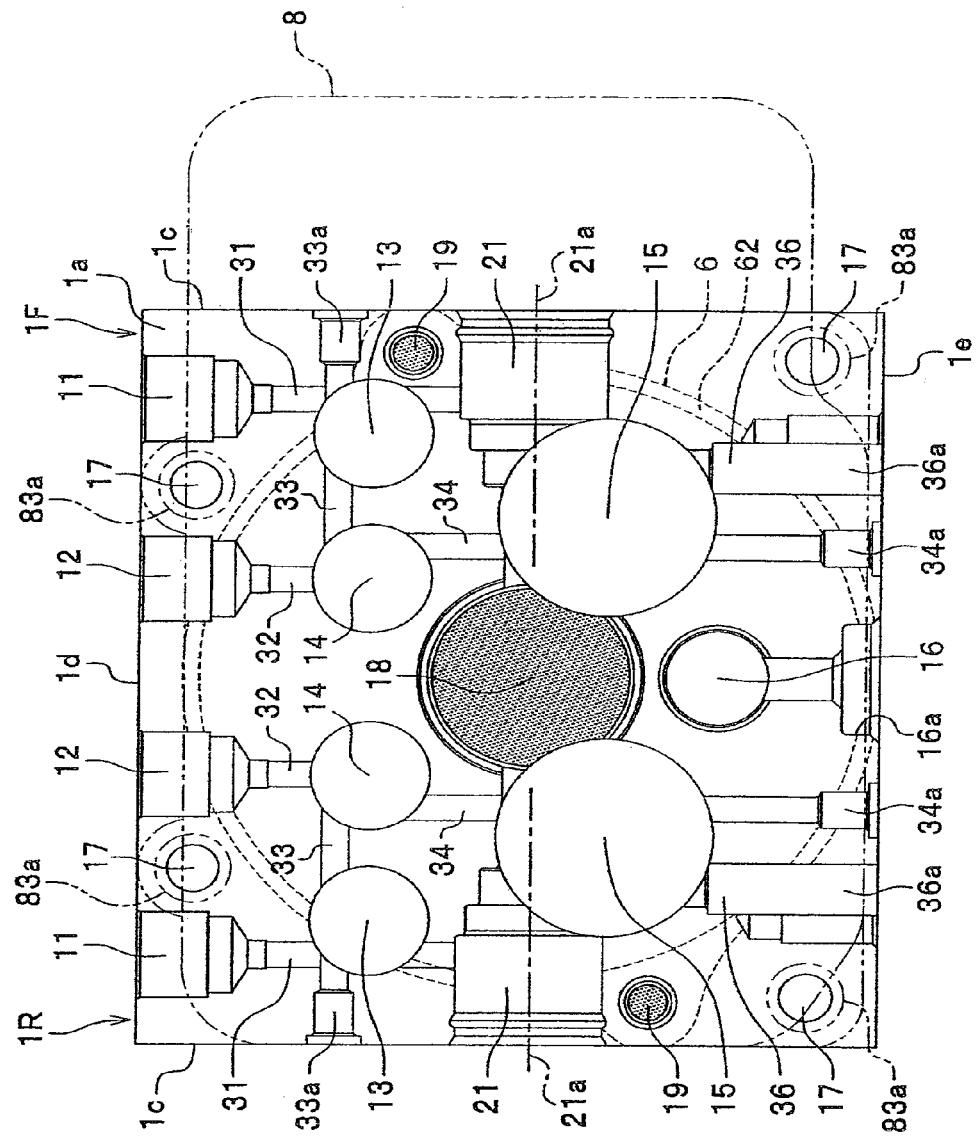
FIG. 4 is a front view of the base body according to the embodiment of the invention in which insides of holes and hydraulic lines formed therein are visualized.
Figure 5:
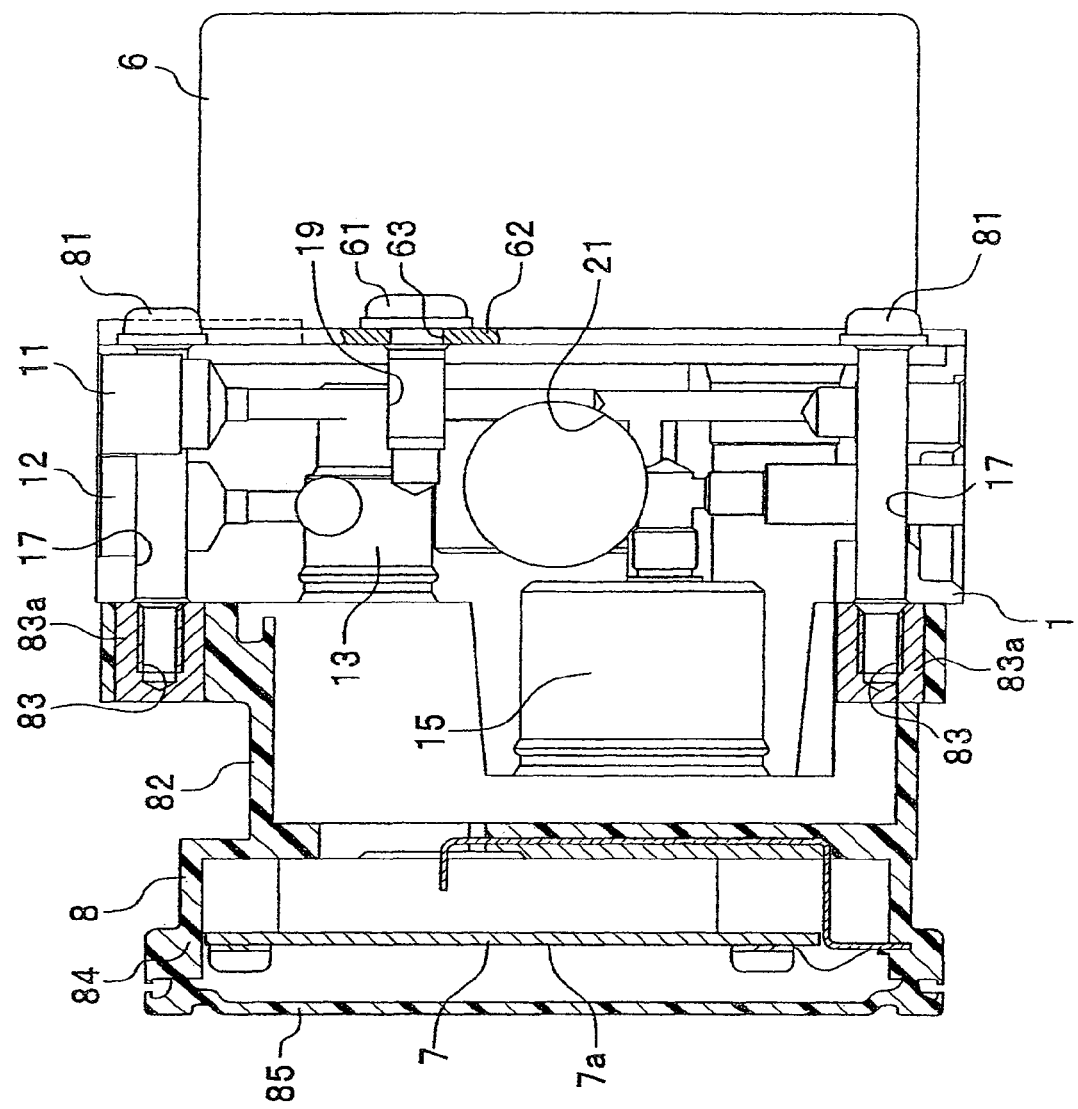
FIG. 5 is a partially sectional view of the brake hydraulic pressure control unit for the vehicle with the handlebar according to the embodiment of the invention and FIG. 6 is a rear view of the brake hydraulic pressure control unit for the vehicle with the handlebar according to the embodiment of the invention.
Figure 6:
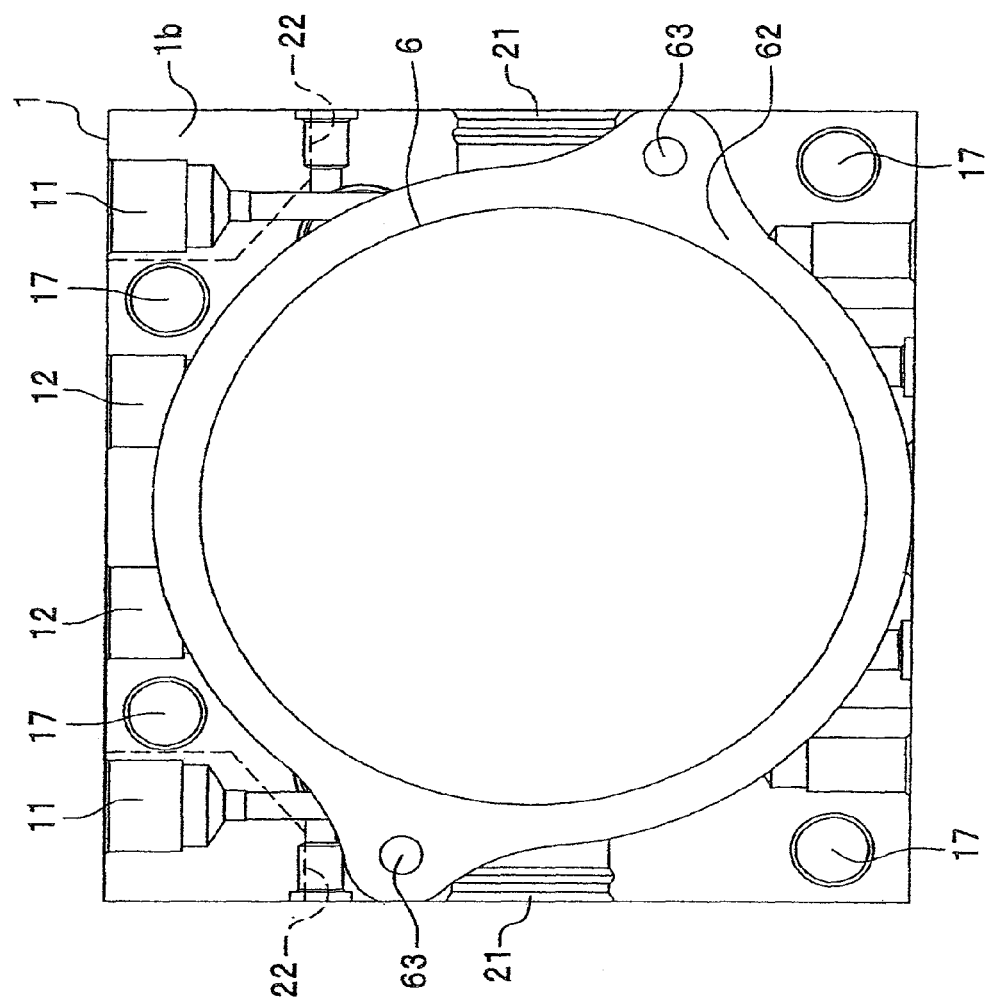

Here, FIG. 1 is an exploded perspective view of the brake hydraulic pressure control unit U. FIG. 2 is a perspective view of the base body as viewed from a forward obliquely upward position. FIG. 3 is a perspective view of the base body as viewed from a rear obliquely downward position. FIG. 4 is a front view of the base body in which insides of holes and hydraulic lines formed therein are visualized. FIG. 5 is a partially sectional view of the brake hydraulic pressure control unit U. FIG. 6 is a rear view of the brake hydraulic pressure control unit U. Note that in FIG. 5, the housing 8 is shown in cross section, the base body 1 is shown as the insides of the holes and the flow paths being visualized, and the motor 6 is shown as being partially sectioned at a flange thereof. In FIG. 6, the base body 1 is shown as the insides of the holes and the flow paths being visualized.

As shown in FIG. 1, the base body 1 is a metallic member which exhibits a substantially rectangular parallelepiped shape. Onto the front surface 1a thereof, the solenoid valves 2, 3, the reservoirs 4 and the housing 8 are assembled. On the other hand, onto the back surface 1b, the motor 6 is assemble (refer to FIG. 3). The pump 5 is assembled onto side surfaces 1c, and inlet ports 11, 11 and outlet ports 12, 12 are made to open to an upper surface 1d of the base body 1.

As shown in FIGS. 1 and 2, two inlet valve mounting holes 13, 13, two outlet valve mounting holes 14, 14 and two reservoir holes 15, 15 are made to open to the front surface 1a. In addition, a terminal hole 16 into which a terminal rod 6b of the motor 6 is inserted and four housing mounting through holes 17, 17 . . . through which housing mounting screws 81 for fixing the housing 8 are passed are made to open to the front surface 1a. The terminal hole 16 and the housing mounting through holes 17, 17 . . . are formed in such a manner as to penetrate the base body 1 from the back surface 1b (refer to FIG. 3) to the front surface 1a.

In this embodiment, the inlet ports 11, 11, the outlet ports 12, 12, the inlet valve mounting holes 13, 13, the outlet valve mounting holes 14, 14, the reservoir holes 15, 15 and the housing mounting through holes 17, 17, . . . are disposed laterally symmetrical across a center line X of the base body 1. The terminal hole 16 is disposed below the two reservoir holes 15, 15 and on the center line X (centrally in a lateral direction).

In addition, the reservoir holes 15, 15 and the terminal hole 16 are formed in such a manner as to extend further forwards than portions of the front surface where the mounting holes of the solenoid valves 2, 3 are made to open, and the base body 1 projects forwards in a cylindrical fashion therearound. A vent hole 16a (refer to FIGS. 3 and 4), which is made to open to a lower surface 1e of the base body 1, is formed in a lower portion of the terminal hole 16 in such a manner as to communicate therewith.

As shown in FIG. 3, a bearing hole 18 into which a rotational shaft of the motor 6 is inserted, a terminal hole 16, two motor mounting holes 19, 19 through which motor mounting screws 61 (refer to FIG. 1) are screwed, and four housing mounting through holes 17, 17, . . . are made to open to the back surface 1b. The terminal hole 16 and the bearing hole 18 are disposed on the center line X (centrally in the lateral direction).

Pump holes 21 are made to open to the respective side surfaces 1c (refer to FIGS. 2 and 3).

As shown in FIGS. 2 and 3, two hydraulic pipe line configuring portions 1F, 1R which correspond to two brake systems or circuits are formed in the base body 1.

Specifically, a hydraulic pipe line configuring portion 1F corresponding to a brake circuit for a front wheel is formed in a right half portion (an area residing further rightwards than the center line X) of the base body 1 as viewed from the front surface 1a side. A hydraulic pipe line configuring portion 1R corresponding to a brake circuit for a rear wheel is formed in a left half (an area residing further leftwards than the center line X) of the base body 1.

In addition, although illustration is omitted, there will be no problem if the hydraulic pipe line configuring portion corresponding to the brake circuit for the rear wheel is formed in the right half portion of the base body 1, and the hydraulic pipe line configuring portion corresponding to the brake circuit for the front wheel is formed in the left half portion of the base body 1. In addition, in this embodiment, the hydraulic pipe line configuring portions 1F, 1R are made substantially symmetrical laterally including their interior configurations.

The inlet port 11 is a portion to which a piping (not shown) from a hydraulic pressure source is connected. As shown in FIG. 4, the inlet port 11 is formed into a bottomed cylindrical hole and is made to open to the upper surface 1d of the base body 1. The inlet port 11 is formed further laterally outwards (closer to the side surface 1c) and rearwards than the outlet port 12. As viewed from the back surface 1b side, raised portions 22, 22 (refer to FIG. 3) are formed on positions corresponding to the inlet ports 11 in such a manner as to project rearwards, so that a thicker thickness is ensured at the portions behind the inlet ports 11.

A first hydraulic line 31 is formed in such a manner as to extend downwards in a vertical direction (in a direction normal to an axial direction of the pump hole 21) from a lower portion of the inlet port 11. The first hydraulic line 31 communicates with the pump hole 21 from the inlet port 11 via a deep portion of the inlet valve mounting hole 13. The first hydraulic line 31 is a vertical hole which is opened from a bottom surface of the inlet port 11 towards the lower surface 1e of the base body 1 and is connected to a back surface 1b side of a shallow portion (on an outlet side) of the pump hole 21 for communication.

The inlet valve mounting hole 13 is a bottomed and stepped cylindrical hole in which the normally open solenoid valve 2 (refer to FIG. 1) which constitutes an inlet valve is mounted and is formed below the inlet port 11. The inlet valve mounting hole 13 communicates with the outlet valve mounting hole 14 via a third hydraulic line 33. The third hydraulic line 33 is made up of a horizontal hole 33a which is provided in the side surface 1c in such a manner as to extend therefrom and penetrate laterally through side walls of the inlet valve mounting hole 13 to reach a side wall of the outlet valve mounting hole 14. In addition, an opening of this horizontal hole 33a which is made to open to the side surface 1c is tightly sealed with a plug member, not shown.

The outlet port 12 is a portion to which a piping (not shown) reaching to a wheel brake is connected. The outlet port 12 is a bottomed cylindrical hole and is made to open to the upper surface 1d of the base body 1. The outlet port 12 is formed further laterally inwards (closer to the center line X) and forwards than the inlet port 11.

A second hydraulic line 32 is formed in such a manner as to extend in parallel with the first hydraulic line 31 (downwards in the vertical direction) from a lower portion of the outlet port 12. The second hydraulic line 32 establishes a communication from the outlet port 12 to the outlet valve mounting hole 14. The second hydraulic line 32 is a vertical hole which is opened to extend from a bottom surface of the outlet port 12 towards the lower surface 1e side of the base body 1 and reaches the shallow portion (the inlet side) of the outlet valve mounting hole 14.

The outlet valve mounting hole 14 is a bottomed and stepped cylindrical hole in which the normally closed solenoid valve (refer to FIG. 1) which constitutes an outlet valve is mounted and is formed closer to the center line X than the inlet valve mounting hole 13.

The outlet valve mounting hole 14 is formed at the same height as the inlet valve mounting hole 13, that is, in a position which lies apart the same distance from the upper surface as the inlet valve mounting hole 13. The outlet valve mounting hole 14 communicates with the reservoir hole 15 via a fourth hydraulic line 34 which is connected to a deep portion (an inlet side) thereof and a fifth hydraulic line (not shown).

The fourth hydraulic line 34 is made up of a vertical hole 34a which is opened to extend from the lower surface 1e of the base body 1 to a side wall of the deep portion of the outlet valve mounting hole 14, and the fifth hydraulic line is made up of a horizontal hole which is opened to extend from a bottom surface of the reservoir hole 15 towards the back surface 1b and is formed to intersect the fourth hydraulic line 34. In addition, an opening of the vertical hole 34a which is made to open to the lower surface 1e is tightly sealed with a plug member, not shown.

The bearing hole 18 is a bottomed and stepped cylindrical hole into which a distal end portion of a rotational shaft 6a of the motor 6 is inserted. The bearing hole 18 is formed in such a manner as to open to the back surface 1b of the base body 1 and is disposed on the center line X (centrally in the lateral direction) and obliquely downwards of the outlet valve mounting hole 14. The pump hole 21 is made to open to a side surface of the bearing hole 18.

The pump hole 21 is a stepped cylindrical hole in which the pump 5 (refer to FIG. 1) is mounted and is formed to penetrate from the side surface 1c of the base body 1 towards the side surface of the bearing hole 18.

The reservoir hole 15 is a bottomed cylindrical hole in which the reservoir 4 (refer to FIG. 1) is mounted and is formed to open to the front surface 1a below (on a lower surface 1e side of) the inlet valve mounting hole 13 and the outlet valve mounting hole 14. The reservoir hole 15 is formed closer to the front surface 1a than the pump hole 21 and is provided in such a manner as to overlap a center axis 21a (refer to FIG. 4) of the pump hole 21 in at least a portion of a bottom surface thereof as viewed from the front surface 1a side of the base body 1. The reservoir hole 15 communicates with a deep portion of the pump hole 21 via a sixth hydraulic line 36 and a seventh hydraulic line (not shown).

The sixth hydraulic line 36 is made up of a vertical hole 36a which is opened to extend from the lower surface 1e of the base body 1 to a side wall (a circumferential surface) of the deep portion (an inlet side) of the pump hole 21. The seventh hydraulic line is made up of a horizontal hole which is opened to extend from the bottom surface of the reservoir hole 15 towards the back surface 1b and is formed in such a manner as to intersect the sixth hydraulic line 36. In addition, an opening of the vertical hole 36a which is made to open to the lower surface 1e is tightly sealed with a plug member, not shown.

The housing mounting through holes 17 are formed in top left and right and bottom left and right four positions as viewed from the front surface 1a of the base body 1.

The upper housing mounting through holes 17, 17 are formed above the third hydraulic line 33 between the inlet port 11 and the outlet port 12 of the hydraulic pipe line configuring portion 1F and above the third hydraulic line 33 between the inlet port 11 and the outlet port 12 of the hydraulic pipe line configuring portion 1R, respectively.

The lower housing mounting through holes 17, 17 are formed, respectively, in positions in the vicinity of both lower corner portions of the front surface 1a in such a manner as not to interfere with the other holes.

The respective housing mounting through holes 17, 17, are formed in the positions which correspond to a frame portion 82 (refer to FIG. 1) of the housing 8. Furthermore, as viewed from the back surface 1b side, the respective housing mounting through holes 17, 17, . . . are formed in the positions which do not overlap a flange 62 (indicated by broken lines in FIG. 4) of the motor 6.

In other words, the housing mounting through holes 17, 17, . . . are each formed in such a manner as to be offset a predetermined distance from a portion which abuts the flange portion 62 of the motor 6, so that a head and a shank of a housing mounting screw 81 do not interfere with the flange 62 of the motor 6.

As shown in FIGS. 3 and 4, two motor mounting holes 19 are formed, and internal screws are formed on inner sides thereof.

One of the motor mounting holes 19 is formed above one of the pump holes 21 which are formed on both sides of the bearing hole 18, and the other motor mounting hole 19 is formed below the other pump hole 21.

In FIG. 4, the motor mounting hole 19 which is formed in an upper right-hand side portion is formed in the position where it interferes with no other holes and an upper end of the same hole is positioned further downwards than an upper end portion of the motor 6. In FIG. 4, the motor mounting hole 19 which is formed in a lower left-hand portion is formed in the position where it interferes with no other holes and a lower end of the same hole is positioned further upwards than a lower end portion of the motor 6.

In other words, the respective motor mounting holes 19, 19 are formed in the upper and lower positions within the range defined from the upper end portion to the lower end portion of the motor 6. Furthermore, the motor mounting holes 19, 19 are formed in the positions which are point symmetrical with each other about an axial center of the bearing hole 18.

(Housing)

As shown in FIG. 5, the housing 8 includes the frame portion 82 which constitutes a side wall of the housing 8 and surrounds the solenoid valves 2, 3 (refer to FIG. 1) and the reservoirs 4, a substrate fixing portion 84 which supports a substrate (printed circuit board: PCB) 7a which makes up the electronic control unit 7 provided at the front of the frame portion 82, and a lid portion 85 which covers the substrate 7a. Housing mounting holes 83 are provided on the frame portion 82.

In this embodiment, the housing mounting hole 83 is made up of a nut 83a which is embedded in the frame portion 82 through insert molding. The housing mounting hole 83 is made to open towards the base body 1 and is provided in a position which confront the housing mounting through hole 17 which is made to open to the front surface 1a of the base body 1.

(Motor)

As shown in FIGS. 1, 5 and 6, the flange 62 having motor mounting through holes 63 is provided on the motor 6. Two motor mounting holes 63 are formed in such a manner as to confront the motor mounting holes 19 on the base body 1 and are formed in positions which are point symmetrical with each other about an axial center of the motor 6.

(Fixing of Housing and Motor to Base Body)

Next, a process of fixing the housing 8 and the motor 6 to the base body 1 will be described.

In fixing the housing 8 to the base body 1, after the solenoid valves 2, 3 and the reservoirs 4 have been mounted on the front surface 1a of the base body 1, the housing 8 is brought into abutment with the front surface 1a of the base body 1 in such a manner as to cover these electric constituent components. Then, the housing mounting screws 81, which are longer than the thickness of the base body 1, are passed through the housing mounting through holes 17 from the back surface 1b side of the base body 1 so that their distal ends are made to be screwed into the housing mounting holes 83 of the housing 8, whereby the housing 8 is drawn towards and fixed to the base body 1.

Thereafter, the motor 6 is brought into abutment with the back surface 1b of the base body 1, and the motor mounting screws 61 are passed through the motor mounting through holes 63 from the back surface 1b side of the base body 1, so that the motor mounting screws 63 are screwed into the corresponding motor mounting holes 19 on the base body 1, whereby the motor 6 is pushed against and fixed to the base body 1.

Note that while in the embodiment, the motor 6 is fixed to the base body 1 after the housing 8 has been fixed thereto, the mounting order of the housing 8 and the motor 6 to the base body 1 may be reverse.

According to the brake hydraulic pressure control unit U according to the embodiment that has been described heretofore, since the housing mounting screws 81 are mounted from the back surface 1b side of the base body 1, there is caused no situation in which the housing mounting screws 81 and the screw mounting tool (for example, a screw driver), not shown, come into interference with the substrate fixing portion 84.

Consequently, the installation positions of the housing mounting screws 81 can be shifted inwards, and the flange does not have to be made to project largely from an outer circumferential surface of the housing 8. Thus, a reduction in size of the housing 8 and the base body 1 can be attained, and hence, a reduction in the overall size of the brake hydraulic pressure control unit U can be attained.

In addition, according to the embodiment, since the housing mounting screws 81 and the motor mounting screws 61 are provided separately, tolerances only have to be considered between the motor mounting holes 19 of the base body 1 and the motor mounting through holes 63 of the motor 6 and between the housing mounting through holes 17 of the base body 1 and the housing mounting holes 83 of the housing 8.

Consequently, inside diameters of the motor mounting through holes 63 of the motor 6 and the housing mounting through holes 17 of the base body 1 do not have to be increased more than required, whereby it becomes possible to prevent the enlargement of the base body 1 and the flange 62 of the motor 6, the deterioration in assembling efficiency due to the increased positioning time for positioning between the base body 1, the motor 6 and the housing 8 and the looseness between the base body 1, the motor 6 and the housing 8 due to these constituent components being made to move in the radial direction of the screws.

In addition, since the housing mounting screws 81 and the motor mounting screws 61 can be fastened to be fixed from the same direction, the assembling work of the housing 8 and the motor 6 to the base body 1 is improved.

Furthermore, since the motor mounting holes 19 are formed in the two locations, one of the motor mounting holes 19 being formed above one of the pump holes 21, 21 which are formed on both the sides of the bearing hole 18, the other motor mounting hole 19 being formed below the other pump hole 21, the motor mounting screws 61, 61 can be fixed in the positions which are point symmetrical with each other about the bearing hole 18, whereby the motor 6 can be fixed to the base body 1 in a stable fashion. On top of this, since the respective motor mounting holes 19, 19 are formed in the upper and lower positions within the range from the upper end portion to the lower end portion of the motor 6, the vertical length of the base body 1 can be reduced.

In addition, while in this embodiment, the brake hydraulic pressure control unit is illustrated which is preferably used on the vehicle with the handlebar, there will be no problem even though the aforesaid technical matters are applied to a brake hydraulic pressure control unit for use in an automotive four-wheel vehicle.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake hydraulic pressure control unit comprising:
    a base body which has a front surface and a back surface;
    solenoid valves mounted to the base body;
    pumps incorporated in the base body;
    a control unit which controls the solenoid valves;
    a control housing which is provided on the front surface of the base body and encircles the solenoid valves and the control unit; and
    a motor which is provided on the back surface of the base body and drives the pumps incorporated in the base body, wherein
    a flange having a motor mounting through hole is provided on the motor,
    a motor mounting hole is provided on the base body,
    a motor mounting screw is passed through the motor mounting through hole of the motor from the back surface side, the motor mounting screw being be screwed into the motor mounting hole of the base body to fix the motor to the base body,
    a housing mounting hole is provided on the control housing,
    a housing mounting through hole is formed on the base body as to be offset from a portion of the motor which is in abutment with the base body to the back surface, and
    a housing mounting screw is passed through the housing mounting through hole of the base body from the back surface side so as to be screwed into the housing mounting hole of the control housing to fix the control housing to the base body.

2. The vehicle brake hydraulic pressure control unit as set forth in claim 1, wherein
    pump holes are formed on both sides of a motor bearing hole formed on the base body,
    the motor mounting hole is formed in two locations,
    one of the motor mounting holes is formed, as is seen from the back surface side, to be situated on a side of one of the pump holes in a radial direction, extending along the back surface, of the pump holes, and
    the other motor mounting hole is formed, as is seen from the back surface side, on a side of the other pump hole in an opposite direction to the radial direction.

3. The vehicle brake hydraulic pressure control unit as set forth in claim 1, wherein
    the solenoid valves, reservoirs and the control housing are on the front surface of the base body;
    the pumps are assembled onto side surfaces of the base body;
    inlet ports and outlet ports are open on an upper surface of the base body;
    inlet valve mounting holes, outlet valve mounting holes and reservoir holes open on the front surface;
    a terminal hole into which a terminal rod of the motor is inserted and the housing mounting through hole are open on the front surface; and
    the terminal hole and the housing mounting through hole are formed to penetrate the base body from the back surface to the front surface.

4. The vehicle brake hydraulic pressure control unit as set forth in claim 3, wherein
    the housing mounting hole is plural housing mounting through holes;
    the inlet ports, the outlet ports, the inlet valve mounting holes, the outlet valve mounting holes, the reservoir holes and the housing mounting through holes are disposed laterally symmetrical across a center line, in a lateral direction, of the base body; and
    the terminal hole is disposed below the reservoir holes and on the center line.

5. The vehicle brake hydraulic pressure control unit as set forth in claim 4, wherein
    the reservoir holes and the terminal hole extend further forwards than portions of the front surface where the inlet ports and the outlet ports are open; and
    portions of the base body around the reservoir holes and the terminal holes project forward.

6. The vehicle brake hydraulic pressure control unit as set forth in claim 1, wherein the motor mounting hole does not interfere with other holes and an upper end of the motor mounting hole is positioned further downwards than an upper end portion of the motor.

7. The vehicle brake hydraulic pressure control unit as set forth in claim 6, wherein the motor mounting hole is a plurality of motor mounting holes formed in upper and lower positions within a range defined from an upper end portion to a lower end portion of the motor.

8. The vehicle brake hydraulic pressure control unit as set forth in claim 7, wherein the motor mounting holes are in positions which are point symmetrical with each other about an axial center of a bearing hole.

9. The vehicle brake hydraulic pressure control unit as set forth in claim 1, wherein the housing comprises:
    a frame portion which constitutes a side wall of the housing and surrounds the solenoid valves and reservoirs,
    a substrate fixing portion which supports a substrate of the electronic control unit provided in front of the frame portion, and
    a lid portion which covers the substrate,
    wherein the housing mounting hole is provided on the frame portion.

10. The vehicle brake hydraulic pressure control unit as set forth in claim 9, wherein the housing mounting hole is made up of a nut which is embedded in the frame portion.

11. The vehicle brake hydraulic pressure control unit as set forth in claim 10, wherein the housing mounting hole opens towards the base body and is provided in a position which confronts the housing mounting through hole being open on the front surface of the base body.

12. The vehicle brake hydraulic pressure control unit as set forth in claim 1, wherein
the motor mounting through hole is plural motor mounting through holes;
the motor mounting hole is plural motor mounting holes;
the flange is provided on a circumference of the motor and includes the motor mounting through holes; and
the motor mounting holes are formed as to confront other of the motor mounting holes of the base body and are formed in positions which are point symmetrical with each other about an axial center of the motor.

13. The vehicle brake hydraulic pressure control unit as set forth in claim 1, wherein the housing mounting screw and the motor mounting screw are separate screws.

14. The vehicle brake hydraulic pressure control unit as set forth in claim 13, wherein the housing mounting screw and the motor mounting screw are fastened to be fixed from a same direction.

15. The vehicle brake hydraulic pressure control unit as set forth in claim 2, wherein
the motor mounting screw is plural motor mounting screws;
one of the motor mounting holes being formed above one of pump holes;
the other motor mounting hole is formed below an other pump hole; and
the motor mounting screws are fixed in the positions which are point symmetrical with each other about the motor bearing hole.

16. A vehicle brake hydraulic pressure control unit comprising:
a base body which has a front surface and a back surface;
a motor provided on the back surface of the base body, wherein
the motor includes motor mounting through holes,
the base body includes motor mounting holes,
motor mounting screws are passed through the motor mounting through holes of the motor from the back surface side to be screwed into the motor mounting holes of the base body to fix the motor to the base body,
housing mounting holes are provided on a control housing,
housing mounting through holes are formed on the base body and are offset from a portion of the motor which abuts against the back surface of the base body, and
housing mounting screws are passed through the housing mounting through holes of the base body from the back surface side so as to be screwed into the housing mounting holes of the control housing to fix the control housing to the base body.

17. The vehicle brake hydraulic pressure control unit as set forth in claim 16, wherein the housing mounting screws and the motor mounting screws are separate screws.

18. The vehicle brake hydraulic pressure control unit as set forth in claim 16, wherein
the motor includes a flange on a circumference thereof, and the motor mounting through holes are provided in the flange.

19. The vehicle brake hydraulic pressure control unit as set forth in claim 16, wherein the motor mounting holes extend partially within the base body and the housing mounting through holes extend entirely through the base body.

20. The vehicle brake hydraulic pressure control unit as set forth in claim 16, wherein the motor mounting holes do not interfere with other mounting holes.

21. The vehicle brake hydraulic pressure control unit as set forth in claim 1, wherein the housing mounting screw is passed through the housing mounting through hole of the base body from the back surface side so as to be screwed into the housing mounting hole of the control housing to directly fix the control housing to the base body.

22. A vehicle brake hydraulic pressure control unit comprising:
a base body which has a front surface and a back surface;
solenoid valves mounted to the base body;
pumps incorporated in the base body;
a control unit which controls the solenoid valves;
a control housing which is provided on the front surface of the base body and encircles the solenoid valves and the control unit; and
a motor which is provided on the back surface of the base body and drives the pumps incorporated in the base body, wherein
a flange having a motor mounting through hole is provided on the motor,
a motor mounting hole is provided on the base body,
a motor mounting screw is passed through the motor mounting through hole of the motor from the back surface side, the motor mounting screw being screwed into the motor mounting hole of the base body to fix the motor to the base body,
a housing mounting hole is provided on the control housing, wherein the housing mounting hole comprises a nut which is embedded in a frame portion of the control housing,
a housing mounting through hole is formed on the base body as to be offset from a portion of the motor which is in abutment with the base body on the back surface, and
a housing mounting screw is passed through the housing mounting through hole of the base body from the back surface side so as to be screwed into the housing mounting hole of the control housing to fix the control housing to the base body by the nut.

* * * * *